US009069002B2

(12) United States Patent
Moro

(10) Patent No.: US 9,069,002 B2
(45) Date of Patent: Jun. 30, 2015

(54) DEVICE FOR REGULATING A WIRE ANEMOMETER

(75) Inventor: Jean-Paul Moro, Saint Beron (FR)

(73) Assignee: COMMISSARIAT A L'ENERGIE ATOMIQUE ET AUX ENERGIES ALTERNATIVES, Paris (FR)

( * ) Notice: Subject to any disclaimer, the term of this patent is extended or adjusted under 35 U.S.C. 154(b) by 640 days.

(21) Appl. No.: 13/140,808

(22) PCT Filed: Dec. 18, 2009

(86) PCT No.: PCT/EP2009/067583
§ 371 (c)(1),
(2), (4) Date: Sep. 6, 2011

(87) PCT Pub. No.: WO2010/070125
PCT Pub. Date: Jun. 24, 2010

(65) Prior Publication Data
US 2011/0308312 A1 Dec. 22, 2011

(30) Foreign Application Priority Data

Dec. 19, 2008 (FR) ...................................... 08 58874

(51) Int. Cl.
G01P 5/06 (2006.01)
G01F 1/68 (2006.01)
G01P 5/10 (2006.01)

(52) U.S. Cl.
CPC .......................................... *G01P 5/10* (2013.01)

(58) Field of Classification Search
None
See application file for complete search history.

(56) References Cited

U.S. PATENT DOCUMENTS

| 2,870,305 | A | | 1/1959 | Sung-Ching | |
|---|---|---|---|---|---|
| 3,363,462 | A | * | 1/1968 | Sabin | 73/204.15 |
| 3,408,859 | A | * | 11/1968 | Konen | 73/54.01 |
| 3,634,757 | A | * | 1/1972 | Monomakhoff | 324/693 |
| 3,803,913 | A | * | 4/1974 | Tracer | 73/204.14 |
| 3,859,594 | A | * | 1/1975 | Grindheim | 324/610 |
| 4,494,406 | A | * | 1/1985 | Komons et al. | 73/204.22 |
| 4,517,735 | A | | 5/1985 | Watkins | |
| 4,685,331 | A | * | 8/1987 | Renken et al. | 73/204.15 |
| 4,860,583 | A | * | 8/1989 | Olson | 73/204.15 |
| 4,901,018 | A | | 2/1990 | Lew | |
| 5,053,692 | A | * | 10/1991 | Craddock | 323/365 |
| 5,237,867 | A | * | 8/1993 | Cook, Jr. | 73/204.15 |
| 5,272,915 | A | * | 12/1993 | Gelbach et al. | 73/204.26 |

(Continued)

FOREIGN PATENT DOCUMENTS

CN 1158985 A 9/1997
CN 102308221 A 1/2012
(Continued)

OTHER PUBLICATIONS

U.S. Office Action in U.S. Appl. No. 13/140,821, mailed on Jan. 7, 2013.

(Continued)

*Primary Examiner* — Harshad R Patel
(74) *Attorney, Agent, or Firm* — Nixon Peabody LLP; Robert E. Krebs

(57) ABSTRACT

An anemometer probe having a single wire or n wires (n>1) that are mutually parallel, for a measurement close to a wall, comprising, for each wire: a) two pins for holding the wire in place, the end of each pin having a flat zone for positioning and fastening the wire; and b) a straight portion of wire brazed onto said flat zones for positioning and fastening the wire.

14 Claims, 10 Drawing Sheets

(56) References Cited

U.S. PATENT DOCUMENTS

| | | | |
|---|---|---|---|
| 5,441,343 A | | 8/1995 | Pylkki |
| 5,518,002 A | * | 5/1996 | Wolf et al. .................. 600/538 |
| 6,470,741 B1 | * | 10/2002 | Fathollahzadeh .......... 73/204.15 |
| 6,810,345 B2 | * | 10/2004 | Matsumura et al. ....... 73/204.14 |
| 7,380,471 B2 | * | 6/2008 | Geller ....................... 73/861.85 |
| 7,915,567 B2 | | 3/2011 | Lhuillier |
| 2003/0154781 A1 | * | 8/2003 | Matsumura ............... 73/204.15 |
| 2004/0040386 A1 | | 3/2004 | Higgins |
| 2004/0217738 A1 | * | 11/2004 | Cheiky et al. ................. 320/128 |
| 2007/0090836 A1 | | 4/2007 | Xiang et al. |
| 2007/0296413 A1 | | 12/2007 | Park et al. |
| 2008/0034861 A1 | | 2/2008 | Bognar |
| 2010/0253364 A1 | | 10/2010 | Ganesh |
| 2011/0167902 A1 | * | 7/2011 | Graboi et al. ............. 73/204.18 |
| 2011/0296910 A1 | * | 12/2011 | Lopez et al. .............. 73/204.27 |
| 2011/0303002 A1 | | 12/2011 | Moro |
| 2011/0308312 A1 | | 12/2011 | Moro |

FOREIGN PATENT DOCUMENTS

| | | |
|---|---|---|
| CN | 102317795 A | 1/2012 |
| CN | 102317795 B | 3/2013 |
| EP | 0522496 A2 | 1/1993 |
| JP | 62-17626 A | 1/1987 |
| JP | 3-24973 B2 | 4/1991 |
| JP | 11-183414 A | 7/1999 |
| JP | 2979742 B2 | 11/1999 |
| JP | 3042040 B2 | 3/2000 |
| JP | 3060607 B2 | 4/2000 |
| JP | 3060608 B2 | 4/2000 |
| JP | 3061034 B2 | 4/2000 |
| JP | 3120478 B2 | 10/2000 |
| JP | 2607815 Y2 | 6/2002 |
| JP | 2012513021 A | 6/2012 |
| JP | 2012513022 A | 6/2012 |
| WO | 2010070119 A1 | 6/2010 |
| WO | 2010070125 A1 | 6/2010 |

OTHER PUBLICATIONS

U.S. Notice of Allowance in U.S. Appl. No. 13/140,821, mailed on May 16, 2013.

Andreopoulos, J. et al., "Experimental Investigation of Jets in a Crossflow," Journal of Fluids Mechanics, vol. 138, 1984, pp. 93-127.

Andreopoulos, J., "Heat Transfer Measurements in a Heated Jet-Pipe Flow Issuing into a Cold Cross Stream," Phys. Fluids, vol. 26, No. 11, 1983, pp. 3201-3210.

Browne, W. B. et al., "Effect of Wire Length on Temperature Statistics in a Turbulent Wake," Experiments in Fluids, vol. 5, No. 6, 1987, pp. 426-428.

Collis, D.C. et al. "Two-Dimensional Convection From Heated Wires at Low Reynolds Numbers," J. Fluid Mech., vol. 6, 1959, pp. 357-384.

Comte-Bellot, G. et al., "On Aerodynamic Disturbances Caused by Single Hot-Wire Probes," ASME, Journal of Applied Mechanics, vol. 38, 1971, pp. 767-774.

Dames, C. et al., "A Hot-Wire Probe for Thermal Measurements of Nanowires and Nanotubes Inside a Transmission Electron Microscope," Review of Scientific Instruments, AIP, Melville, NY, vol. 78, No. 10, Oct. 11, 2007, pp. 104903-1-104903-13.

Erm, L. P., "Modifications to a Constant-Temperature Hot-Wire Anemometer System to Measure Higher-Order Turbulence Terms Using Digital Signal Processing," Department of Defense, Air Operations Division, Aeronautical and Maritime Research Laboratory, Commonwealth of Australia, Sep. 1, 1997, 42 pages.

Ligrani, P. M., "Fabrication and Testing of Subminiature Multi-Sensor Hot-Wire Probes," Journal of Physics E. Scientific Instrument, IOP Publishing, Bristol, GB, vol. 22, No. 4, Apr. 1, 1989, pp. 262-268.

Ligrani, P.M, "Subminiature Hot-Wire Sensors: Development and Use," Journal of Physics E. Scientific Instruments, vol. 20, No. 3, Mar. 1, 1987, pp. 323-332.

Sarma, G. R., "Transfer Function Analysis of the Constant Voltage Anemometer," Review of Scientific Instruments, vol. 69, No. 6, 1998, pp. 2385-2391.

Smits A. J. et al., "The Response to Temperature Fluctuations of a Constant-Current Hot-Wire Anemometer," Journal of Physics E. Scientific Instruments, vol. 11, No. 9, Sep. 1, 1978, pp. 909-914.

Tavoularis, S., "Chapter 11: Measurement of Local Flow Velocity ED," Measurement in Fluid Mechanics, Cambridge University Press, Jan. 1, 2005, pp. 249-264.

Willmarth, W. W. et al., "Study of Turbulent Structure With Hot Wires Smaller Than The Viscous Length," J. Fluid Mech., vol. 142, 1984, pp. 121-149.

French Search Report in French Application No. FR 0858879, mailed Aug. 13, 2009.

French Search Report in French Application No. FR 0858874, mailed Aug. 12, 2009.

International Search Report and Written Opinion in PCT Application No. PCT/EP2009/067583, mailed Feb. 4, 2010.

International Search Report and Written Opinion in PCT Application No. PCT/US2009/067577, mailed Feb. 5, 2010.

International Preliminary Report on Patentability in PCT Application No. PCT/EP2009/067583, dated Jul. 5, 2011.

International Preliminary Report on Patentability in PCT Application No. PCT/US2009/067577, dated Jun. 14, 2011.

Notice of Allowance Japanese Patent Application No. 2011-541489, mailed on Apr. 15, 2014.

Notice of Allowance in U.S. Appl. No. 13/140,821, dated Jun. 24, 2013.

Notice of Allowance in U.S. Appl. No. 13/140,821, dated Mar. 26, 2014.

Notice of Allowance in U.S. Appl. No. 13/140,821, dated May 8, 2014.

Notice of Refusal in Japanese Patent Application No. 2011-541488, mailed on Jun. 11, 2013.

Notice of Refusal in Japanese Patent Application No. 2011-541488, mailed on Oct. 22, 2013.

Third Office Action in Chinese Application No. 200980156328.X, mailed on Nov. 12, 2013.

Second Office Action in Chinese Application No. 200980156328.X, mailed on Apr. 3, 2013.

First Office Action in Chinese Application No. 200980156328.X, mailed on Jun. 19, 2012.

Fourth Office Action in Chinese Application No. 200980156328.X, mailed on Jun. 6, 2014.

Second Notice of Refusal in Japanese Patent Application No. 2011-541488, mailed on Aug. 19, 2014.

* cited by examiner

DEVICE FOR REGULATING A WIRE ANEMOMETER

CROSS REFERENCE TO RELATED APPLICATIONS OR PRIORITY CLAIM

This application is a National Phase of PCT/EP2009/067583, filed Dec. 18, 2009, entitled, "DEVICE FOR REGULATING A WIRE ANEMOMETER", and which claims priority of, French Patent Application No. 08 58874, filed Dec. 19, 2008, the contents of which are incorporated herein by reference in their entirety.

TECHNICAL FIELD AND PRIOR ART

The invention relates to the field of probes for carrying out near wall anemometric measurements.

More specifically, it relates to probes or devices of hot wire or cold wire anemometer type.

It also relates to a method of manufacturing such a probe.

It also relates to a device for regulating the supply and the measurement of such a probe.

The principle of hot wire anemometry will firstly be briefly recalled: according to this technique, a very thin metal wire, of diameter generally of the order of 2 to 5 µm, is heated by Joule effect. If it is placed in a flow, the temperature of which is below that of the wire, it is cooled by forced convection. Fluctuations in velocity and/or in temperature of the fluid of the flow create variations in the temperature of the wire and, therefore, variations in its electrical resistance. It is said variations that are profitably employed in the measurements.

The electrical power released at the level of the wire and therefore exchanged between said wire and the surrounding environment may be supplied in different ways by an electronic circuit, which makes it possible to define three types of anemometers:

the constant current anemometer,
the constant temperature anemometer,
the constant voltage anemometer.

Measurements taken close to a wall are very particular, because the wall influences the velocity measurement by its presence. This results in an overestimation of the velocity value.

This overestimation is explained physically in the following manner. Because it is overheated, the wire is surrounded by a diffusion hot spot. When the distance between the wire and the wall becomes less than the size of said hot spot which encompasses the wire, a transfer of energy to the wall then occurs. For the wire, this results in an increase in the energy transferred which is equivalent, compared to a calibration carried out without wall, to an increase in the measured velocity. This phenomenon of excessive velocity manifests itself from an adimensional distance from the wall of the order of $y^+=6$ ($y^+$ is defined as the product of the friction velocity multiplied by the distance to the wall divided by the kinematic viscosity). Different analytical corrections have been developed to correct the measurements affected by this phenomenon of parietal bridging. These corrective methods all have a serious shortcoming in so far as they are constructed (without exception) from the expected result. They are consequently not applicable to non-established flow situations.

Schematically, a known probe, described in the document of Ligrani and Bradshaw, 1987, and illustrated in FIG. 1, comprises a metal wire 200 (hot wire of diameter 0.625 µm) made of an alloy of platinum with 10% rhodium. Said metal wire is traversed by an electric current in its active portion 601 (heated length) and has a "U" shape.

This wire is fastened to the end of two points 400, 600 held together by Araldite 450 adhesive. The fastening is obtained by two welds (with tin) 220 of the wire on the points.

The spacing e between the ends of the two pins is of the order of 0.5 mm.

As may be seen in FIG. 1, so as to neutralise the blocking effect that such a convergence of the pins generates, the wire defines a plane that is inclined at an angle α of around 15° compared to the plane defined by the points 400, 600. The blocking effect is a perturbation on the flow, brought about by the too close proximity of the ends of the pins. Said perturbation affects any measurement carried out at the level of the active portion 601.

A problem is thus to be able to produce a probe that improves the performances of such a probe. In particular, a probe of the type of that of FIG. 1 has problems of resistance to vibrations and sensitivity.

Another aspect of the type of envisaged measurements is the filtering effect. This effect manifests itself when the active zone is too important, providing an averaged or integrated measurement, and not a spot measurement.

Yet, in order to limit this filtering phenomenon, one solution consists in reducing the spacing between the pins in order to reduce the length of wire. However, it will be recalled, as already indicated above, that a blocking effect occurs, which generates on the flow a too important proximity of the pins, as explained by Comte-Bellot et al. in the article entitled "On aerodynamic disturbances caused by single hot-wire probes", ASME, J. Applied Mechanics, vol. 38, 767-774, 1971).

Probes enabling the problems described above to be resolved are not found either in commercially available devices, such as the probes sold by the Dantec or TSI companies.

Known probes, including commercially available anemometric assemblies (typically probes of 2.5 µm diameter associated with a constant temperature anemometer), are thus largely insufficient for the measurement of small scales of turbulence, and totally unsuited for close wall measurements such as those that it is wished to carry out.

Finally, the production of a probe of this type poses numerous technological problems, most of which are not resolved.

One of the problems posed by the invention was thus to find a production method that makes it possible to obtain, in a reproducible manner, a probe exhibiting excellent performance.

Another problem posed by the invention is to find a device for regulating and supplying a wire anemometer at constant current.

A particular operation is the operation known as "cold wire operation". This involves a constant current operating mode, in which the current with which the wire is supplied is very low.

Cold wire anemometers are already known.

In these known devices, the supply comprises a large resistor R placed in series with the wire in order to conserve a constant current intensity Iw in said wire when the velocity of the flow varies. The wire is integrated to a Wheatstone bridge to measure with precision its resistance Rw; the output signal is collected at the summit of the bridge.

The constant current anemometer has advantages. There is a free choice of superheating, which is very appreciated for the study of temperature fluctuations. It is also possible to measure the background noise by substituting the wire by a fixed resistor and then making the corrections that would be necessary to the measurements. On the other hand, the output signals are amplified in an important manner. The pass band of the measurement principle is imposed by the thermal inertia of the wire.

In this type of operation, the current that supplies the wire 200 is made to tend to a zero value in order to heat the latter as little as possible. The wire is thus no longer cooled by convection (in so far as it is not heated), and becomes uniquely sensitive to the temperature of the surrounding environment T through the bias of the value of its resistance $R_{wire}$ according to the relation:

$$R_{wire}=R_0[1+a(T-T_0)]$$

where $R_0$ is the resistance of the probe at a reference temperature and a the coefficient of evolution of the resistance with temperature.

In this type of operation, the temperature difference is small and the current with which the wire 200 is supplied is very weak. It serves just to be able to measure a voltage at the terminals of the wire in order to go up to the value of its resistance. It is generally of the order of 50 to 200 µA. Thus, the heating of the wire by Joule effect is negligible, which is why said anemometer is known as a cold wire thermometer.

A problem posed by this type of operation is the following: the measured temperature drifts, it is thus necessary to associate the probe with a thermocouple to have a measurement of the average temperature.

DESCRIPTION OF THE INVENTION

The invention proposes solutions to these problems.

The invention firstly relates to a device for regulating a wire anemometer, at constant current, comprising:

means for supplying and means for regulating a supply current of the wire and a reference resistor, means for establishing a difference between a signal at the terminals of the wire of the probe and a signal at the terminals of the reference resistor, means for maintaining a constant temperature of the device.

This regulation device may be applied to a probe as described below, or instead to another type of anemometer probe. But particularly interesting results are obtained with a probe as described below.

The wire and the reference resistor are for example current mirror mounted.

The means for regulating a supply current preferably comprise a diode mounted regulating transistor and a potentiometer.

The invention also relates to a thermo-anemometer, having a cold wire, comprising:

an anemometer, for example having the structure already described above, and a regulating device as above.

According to a particular embodiment, a wire anemometer according to the invention comprises:

a) two pins for holding the wire in place, the end of each pin comprising a flat zone for positioning and fastening the wire, b) a straight portion of wire, brazed onto said flat zones for positioning and fastening the wire.

The ends of the pins may be separated by a distance at least equal to 4 mm.

The wire may comprise a central core, of diameter d between 0.35 and 0.6 µm, and a sheath, eliminated on a portion of wire, known as sensitive zone, of length l between 0.4 mm and 0.5 mm.

The wire may be brazed onto the pins of a tin-lead type brazing.

In order to resolve the problems of breakage of the active portion of the wire, it can have a curving contour.

The pins may be fastened to a probe body provided with a vibration dampening envelope.

The invention also relates to a method for measuring temperature in a flowing fluid, comprising the use of a thermo-anemometer as above, without additional thermocouple.

It is in particular possible to measure a variation in temperature and an average temperature by means of the thermo-anemometer according to the invention.

According to another aspect, the invention also makes it possible to produce a probe comprising wires of very small diameter, associated with an important spacing between pins.

The invention thus makes it possible to produce, in a reproducible manner, probes by means of wires of 0.35, 0.5 or 0.625 µm diameter.

The invention thus also relates to an anemometer probe having n wires (n≥1), for a measurement close to a wall, comprising, for each wire:

a) two pins for holding the wire in place, the end of each pin comprising a flat zone for positioning and fastening the wire, b) a straight portion of wire, brazed onto said flat zones for positioning and fastening the wire.

The ends of the pins may be separated by a distance at least equal to 4 mm.

Preferably, the wire comprises a central core made of a platinum and rhodium alloy, of diameter d between 0.35 and 0.6 µm, and a silver sheath, eliminated on a portion of wire, known as sensitive zone, of length between 0.4 mm and 0.5 mm.

A probe according to the invention, of the above type, may thus comprise n (n≥2) wires, which may be mutually parallel. For example, it comprises 2 or 3 or 4 wires that are mutually parallel.

The invention also relates to a method for producing an anemometer probe with n wires (n≥1), for a measurement close to a wall, comprising:

a) the positioning of a straight portion of a wire, comprising a metal core surrounded by a protective sheath, on two pins, the end of each pin comprising a flat zone for positioning and fastening the wire, b) the brazing of the wire on each of the pins, c) the elimination of a portion of the sheath, so as to highlight an active measuring zone of the wire.

Step b) preferably comprises the formation of a curving contour of the wire.

According to an embodiment, this step b) comprises:

the carrying out of a first brazing on a first pin, the relative spacing of the ends of the two pins, the carrying out of the second brazing on the second pin, the release of the ends of the two pins.

According to an embodiment, step c) comprises a stripping of the sheath of the wire to form an active measurement zone, for example:

a first step of stripping with acid, then a second step of electrochemical stripping.

It is possible to carry out a measurement of the resistance of the wire in order to determine the stripped length thereof. Moreover, the stripping may be carried out by means of a loop formed by a wire on which a drop of stripping liquid may be maintained.

In a method of preparation of a wire according to the invention an annealing step at a temperature substantially greater than the temperature at which the wire is intended to be used may be provided.

As for the brazing, it may be carried out by hot air gun, or by laser impact.

Before step a), a prior step of rectification of the wire may be provided.

Before step b), a step of placing the wire under mechanical strain, less than several grammes, for example 6 g or 5 g or 4 g, may be provided.

The invention also relates to a method for measuring anemometric variables, in particular close to a wall, comprising the use of a probe according to the invention.

DETAILED DESCRIPTION OF EMBODIMENTS OF THE INVENTION

An example of a probe according to the invention is illustrated in FIGS. 2A-2E.

According to this example, the probe comprises a wire 2 drawn between the tapering ends of two metal pins 4, 6, which extend into an insulating body 10 of cylindrical shape, preferably made of a ceramic.

More specifically, the probe body 10 is constituted of a ceramic cylinder of diameter that may be for example between 2 and 4 mm, in which are implanted, by way of pins 4, 6, stainless steel needles of diameter for example between 0.2 mm and 0.4 mm.

Figure 2A:
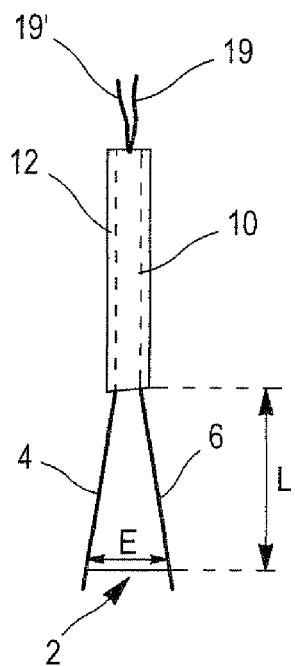
FIGS. 2A-2E represent aspects of a probe according to the invention.
Figure 2B:
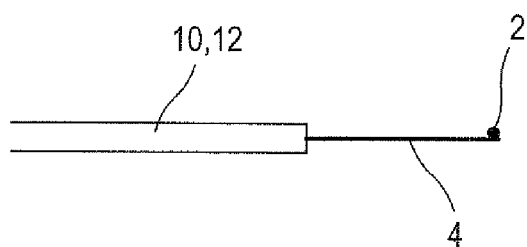
Figure 2C:
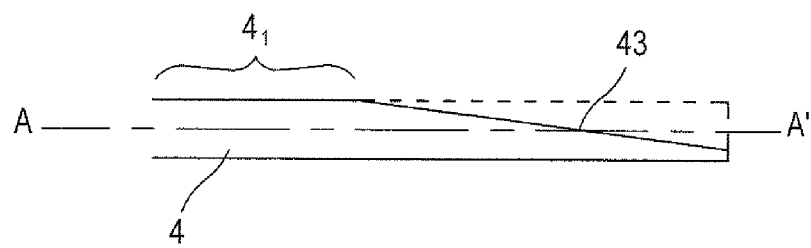

The wire 2 is positioned on portions of the pins which are flattened, as may be seen in FIG. 2C which represents the shape of a pin in side view, before (broken lines) then after (unbroken lines) thinning Reference 43 designates the flattened out portion of the pin 4 represented, on which one end of the wire 2 will be brazed. The other pin 6 has the same end structure. The end structures are obtained by simultaneous thinning of the two ends on a rectification board. The two flat zones thereby defined form a single plane. This positioning contributes to an excellent alignment of the wire. Each pin thus has a body $4_1$ of substantially cylindrical section, the cylinder being truncated at the end by a plane 43 that cuts a direction AA' along which the pin extends substantially. The axis AA' is an axis of symmetry of revolution in the case of a pin of cylindrical shape (FIG. 2C).

Figure 1:
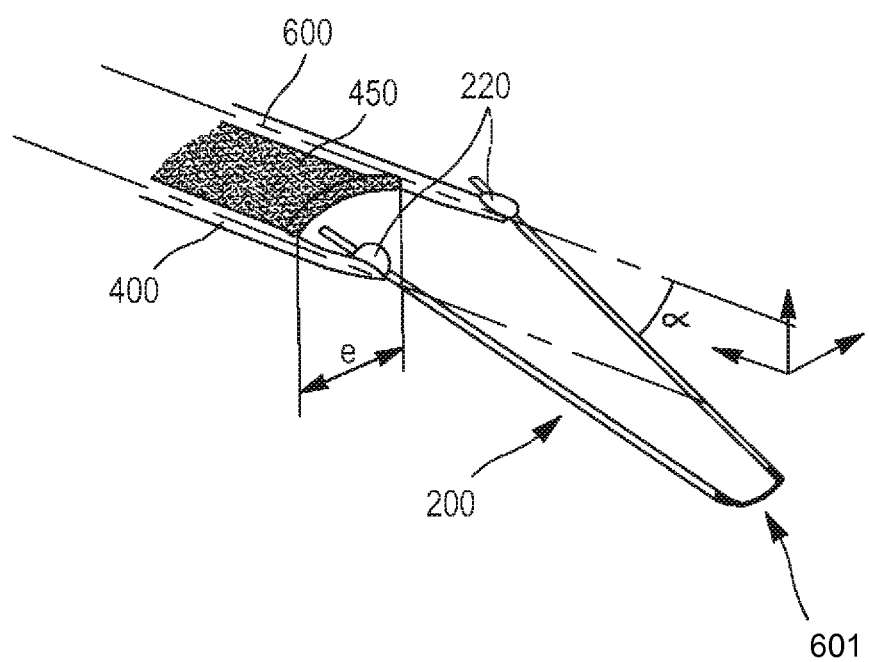
FIG. 1 is a hot wire probe, of known type.

The wire 2 moreover has an extremely precise alignment, of the order of one hundredth of a mm. Unlike the known probe structure (as explained above with reference to FIG. 1), a straight portion of the wire 2 is positioned on the pins 4, 6. There is no need, as in the case of FIG. 1, to curve the wire in a "U" shape, such a curvature adversely affecting the precision and the reproducibility of the device.

The brazing of the wire 2 on the pins 4, 6 is a tin-lead alloy type brazing.

The emerging length L of the pins is approximately of the order of 15 mm, and the distance D that separates them is substantially equal to, or greater than, 5 mm, and preferably between 5 mm and 8 mm, for limit layer flows up to air stream velocities less than or slightly greater than 12 m/s. On the other hand, with situations of high shear, at the jet boundary for example, good behaviour is only obtained when the spacing between the pins does not exceed 4 mm. Above 4 mm, on account of an insufficient stiffness of the silver sheath of the wire 2 (the structure of which is described below), the shear excitation induces oscillations of large amplitude at the scale of the wire, oscillations that lead to the breaking of the latter.

In order to reduce the risks of breaking of the active portion of the wire during handling, the probe body is sheathed with an elastomer tube 12, which is going to absorb the waves or the vibrations that could propagate to the wire 2, which is very fragile.

Figure 2D:
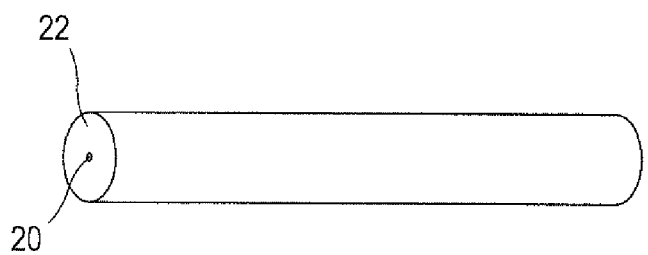

The wire 2 is in fact a wire comprising a central portion 20 made of platinum or a platinum-rhodium alloy, surrounded by a silver sheath 22, which may be of diameter between 30 and 80 µm, as illustrated in FIG. 2D.

The diameter of the central portion 20 is very small, less than 0.635 µm or 0.6 µm, for example 0.35 µm or 0.5 µm. The wire used is preferably a wire of "Wollaston wire" type constituted of a platinum-rhodium alloy (Pt-10% Rh). It is impossible to handle directly a wire of this diameter without risk. The silver sheath, of a diameter of 30 to 80 µm, which surrounds the wire (FIG. 2D) enables this handling.

Figure 2E:
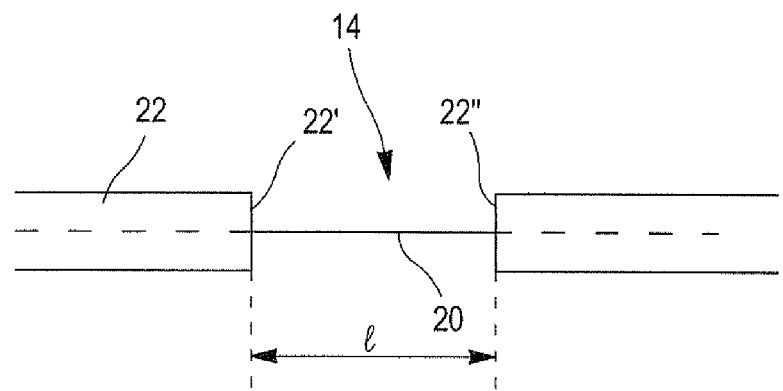

Such a wire offers a spot measurement better than that obtained in known devices, because it is possible to demarcate a measuring zone 14 by locally eliminating the sheath of the wire, as illustrated in FIG. 2E. The result is an active length l between 0.4 mm and 0.5 mm. A shorter active length would adversely affect the measurement, because edge effects, due to the ends 22', 22" of the sheath at the limits of the measurement zone 14, would then be too important. This aspect is illustrated in FIG. 2E, where the active portion 14 and the silver sheath 22 may be clearly seen.

The active portion 14 is not visible in FIG. 2A, because the width of this active portion (between 0.4 mm and 0.5 mm) is small compared to the opening E between the ends of the pins 4, 6 (at least 5 mm).

The ratio l/d, of the active length of the wire to its diameter, is substantially between 600 and 1500 ($600 \leq l/d \leq 1500$). Above this, the spot character of the measurement disappears: the effects of filtering or averaged measurement already mentioned then reappear. With a ratio between 600 and 1500, the hypothesis of bi-dimensionality, thus of a very flat temperature profile in the active zone, is satisfactory.

The wire 2 is connected to the pins 4, 6 by brazing of the silver sheath 22 on said pins.

A probe according to the invention exhibits measurement localisation properties, without filtering effect (on account of the spot nature on the measurement attained by the very small width of the measurement zone 14), without blocking effect (due to the distancing of the ends of the pins from each other). Said probe moreover withstands vibrations. A probe according to the invention thus makes it possible to measure physical variables as close as possible to a wall, without bias, and thus without a correction being necessary. For a velocity range below 10 m/s, it is possible to approach up to $y^+ \approx 2$ without wall correction. $y^+$ is defined as the product of the friction velocity multiplied by the distance to the wall divided by the kinematic viscosity.

The invention does not only relate to a single wire probe but also to a multi wire probe.

Figure 3A:
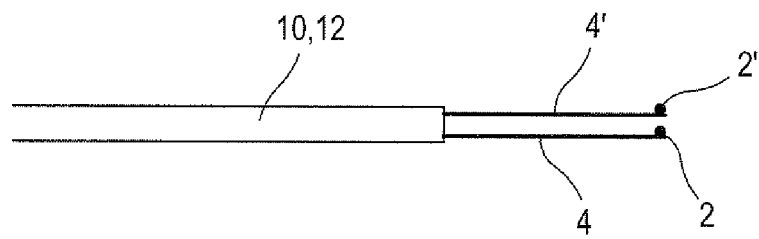
FIGS. 3A-3B represent other types of probe according to the invention, having two wires or having more than two wires.
Figure 3B:
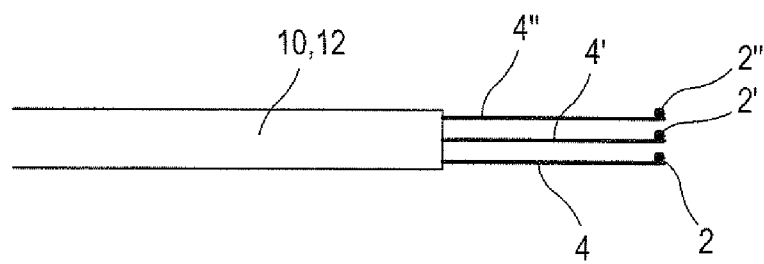

A double probe, for example which associates a parallel hot wire 2 and a cold wire 2', with a spacing between the two wires of the order of 0.3 mm, is also an object of the present invention and is represented, in side view, in FIG. 3A (the wires are only seen from the side, thus each wire 2, 2' is assimilated to a point in this figure and in FIG. 3B). The other references are those of FIGS. 2A-2E and designate the same components. In this embodiment, two pairs of pins are provided, the pair 4, 6 already described above, on which is brazed the wire 2, and another pair 4', 6' (of which only the pin 4' is visible in FIG. 3A) on which is brazed the wire 2'.

A triple probe, which associates three parallel wires 2, 2', 2", is represented, in side view, in FIG. 3B. Here again, the references are those of FIGS. 2A-2E and designate the same components. In this embodiment, three pairs of pins are provided, the pair 4, 6 already described above, on which is brazed the wire 2, and another pair 4', 6' (of which only the pin 4' is visible in FIG. 3B) on which is brazed the wire 2', a third pair 4", 6" (of which only the pin 4" is visible in FIG. 3B) on which is brazed the wire 2". Such a triple probe operates preferably with a hot wire, at the centre (the wire 2') and two cold wires, on either side (the wires 2 and 2"), which gives information on the direction of the flow.

In a double probe, or, more generally, with n wires, at least one of the wires, or each of the wires, has the characteristics indicated above, and is fixed in the manner indicated above, on a pair of pins having flattened end portions, which may have been prepared as already explained.

A method of manufacturing a probe according to the invention will now be described. It relates to the production of a probe having a single wire, and may be applied to the formation of a probe having any number of parallel wires, unless otherwise specified.

All of the operations are preferably carried out under binocular magnifier, given the size of the components and the required precision. This magnifier, or any other chosen means of visualisation or equivalent, makes it possible to visualise with a precision to $1/100^{th}$ of a mm.

Firstly, the pins 4, 6 are made integral with the probe body 10, 12. In the latter, piercings have been made or grooves have been dug in order, as it happens, to position these pins. If necessary, the pins are inserted in the probe body by means of a template so that they extend beyond the probe body by an equal length.

The welded connection between the electrical supply cables 19, 19' (FIG. 2A) (it is via these connection means that the current which has to pass through the wire 2 arrives) and the pins 4, 6 may be located in the groove or the piercings of the body 10 or outside. The welding of this connection is carried out during this preparation step.

The sealing of the pins in the support may be ensured by spread coating of a concrete, the setting of which is compatible with the ceramic. Tests show that an adhesive, for example of Araldite type, can also very well ensure this sealing function, while conserving a certain elasticity that proves to be interesting for the absorption of vibrations and the safeguarding of the probe.

The probe body 10, once provided with its pins 4, 6, is inserted into an elastomer dampening sleeve 12, in order to limit vibrations that could break the active portion of the wire, which is very thin.

In anticipation of the operation of brazing of the wire 2, the end of the pins 4, 6 is also prepared to ensure a good contact surface is obtained. To do this, a slight abrasion of the tip of the pins is carried out by means of fine sand paper, which may be arranged on a rectification board, in order to create a flat 43 at their end, as illustrated in FIG. 2C for the pin 4. One thus has, in the end, a contact cylinder (the wire) on a plane (the flattened tip 43 of the pin) enabling a precise positioning of the wire and a controlled expansion of the brazing on this surface at the moment of melting. Without this flat surface 43 at the end of each of the pins, the contact between the cylinder that constitutes the wire and the cone (the pointed end of each needle 4, 6) would make the placement of the wire 2 delicate, not very precise, and would moreover generate a risk of sagging of the brazing underneath the pin.

After said abrasion, the probe is put in place on the manufacturing support.

Figure 4:
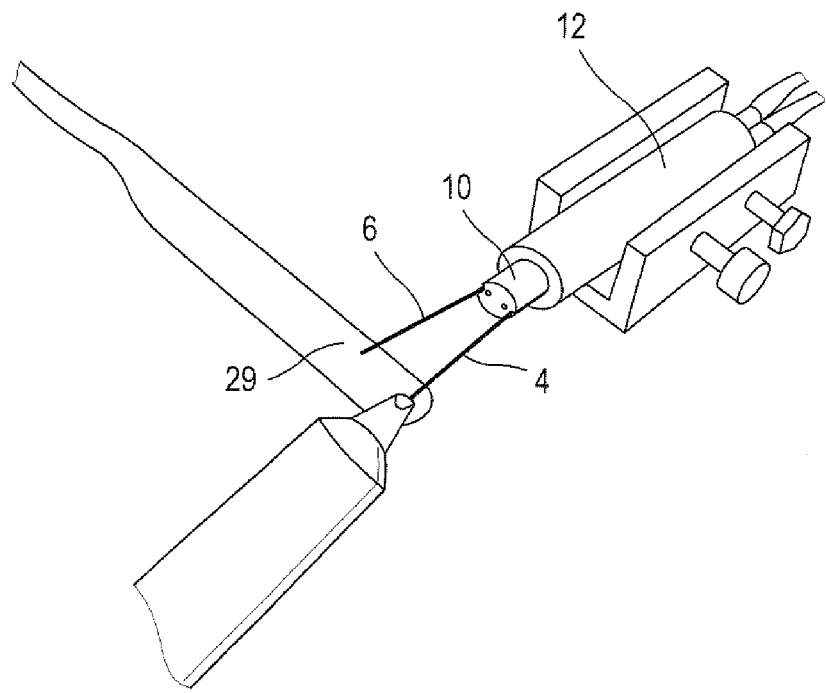
FIGS. 4-10 represent steps of producing a probe according to the invention.

In order to be able to braze the wire, the pins 4, 6 are cleaned to ensure optimal wettability. In order to remove the different oxides and create a support for holding the brazing, the ends of the pins are tinned by means of a brazing paste 29 (reference: Castolin 157A) deposited on a sheet of stainless steel by means of a soldering iron 3, as illustrated in FIG. 4. The pins are then cleaned with acetone.

Figure 5:
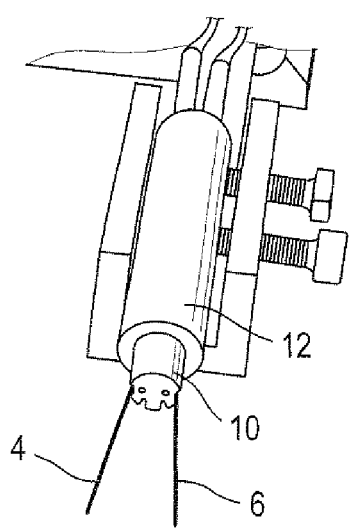

FIG. 5 represents the probe body 10, 12, with its pins 4, 6 ready to accommodate the wire 2 of the probe. The probe body is arranged on a set of micrometric tables, not visible in the figure, which are going to be able to carry out extremely precise movements, along two or three dimensions, to the nearest hundredth of a millimeter.

The wire used, provided with a sheath 22, is in general in the form of reels of several centimeters diameter. This type of coiled conditioning generates a shaping of the wire, all the more important and persistent when the wire is of small diameter. It is thus preferable to roll the wire manually on a flat support in order to minimise the curvature that results from the memory effect of the metal which has remained reeled.

Figure 6A:
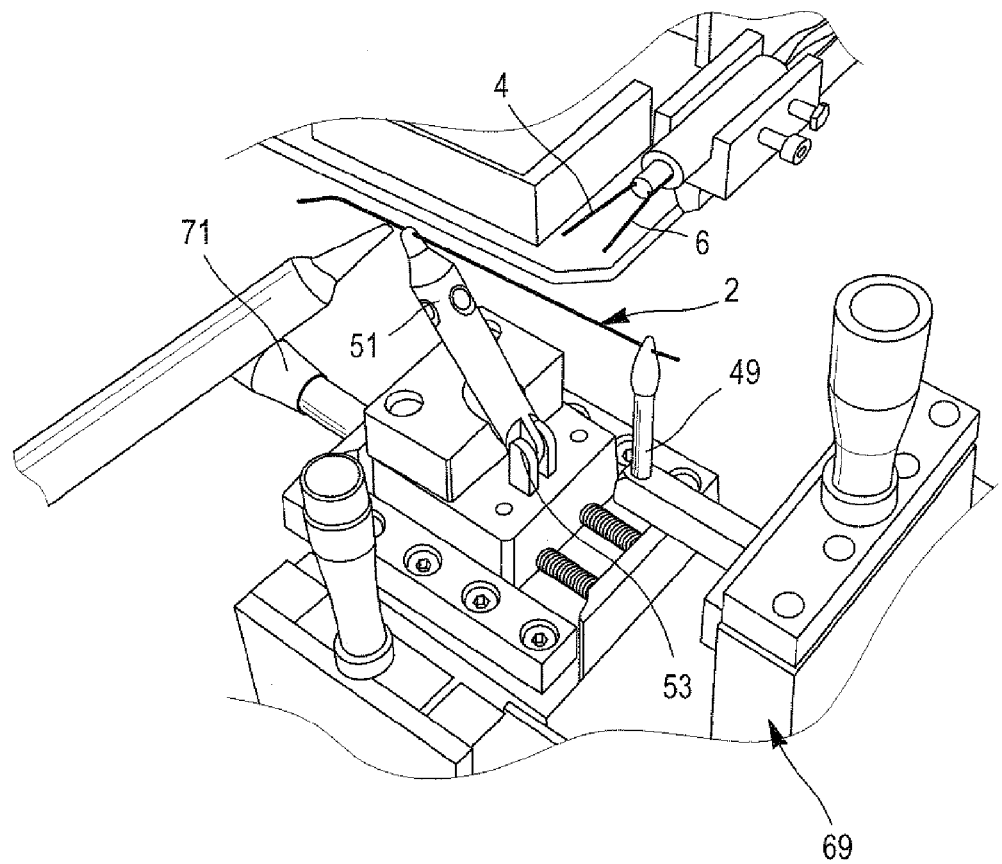
Figure 6B:
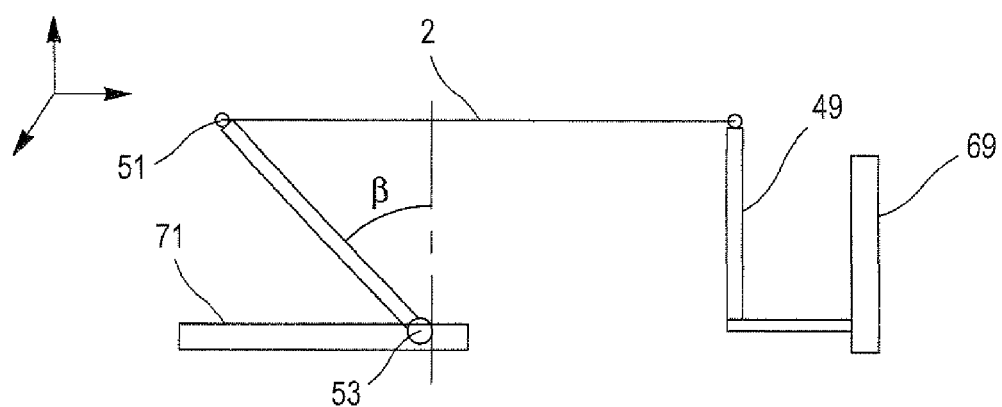

As may be seen in FIGS. 6A and 6B, a support, which is going to make it possible to braze the wire on the pins 4, 6, comprises a fixed vertical arm 49, and a second arm 51, substantially of same size and assembled on a pivot link 53 which enables it to tilt in a vertical plane perpendicular to the axis of the pivot. This support is provided with two micrometric tables 69, 71 making it possible to control the positioning of each of the arms, and thus the alignment of the wire 2 as well as its voltage. Each table is going to make it possible to carry out extremely precise movements, in one, two or three dimensions, to the nearest hundredth of a millimeter.

The ends of the arms 49, 51 are tinned beforehand in order to be able to braze the wire 2. The two arms 49, 51 are then moved away from the support by twenty or so millimeters. The wire is brazed, by means of conventional brazing tin, on the two arms, making sure to indeed leave vertical the moving arm.

In order to control the tension on the wire 2, the moving arm 51 is positioned so that it forms an angle β of 45° with the normal. The weight of this arm 51 is adjusted such that, in this position, the tension on the wire is around 4 g. This value has been chosen after numerous tests intended to obtain a wire 2, just drawn in a reproducible manner. The arm 49 is then lowered with the vertical micrometric table 69 such that the two arms are at the same level and that the wire is as horizontal as possible.

Figure 7:
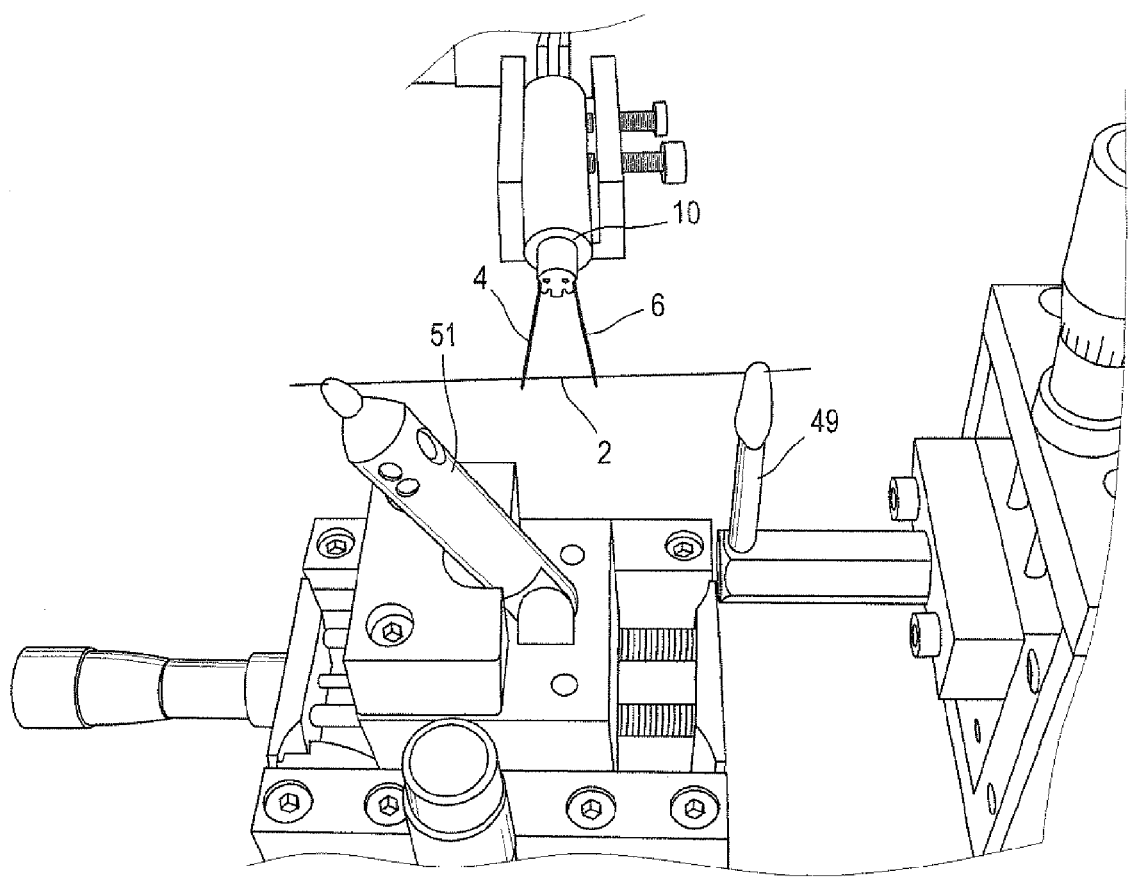

After having approached manually this support, on which the wire is prepared, it is brought into contact with the pins 4, 6, as illustrated in FIG. 7, by means of micrometric tables.

Once this operation has been carried out, the wire 2 and a first pin (for example the pin 4) are degreased with acetone. At the junction between the wire 2 and this first pin is then deposited a very small spot of brazing by means of the end of a needle. This brazing, which it will be seen later is based on lead, is constituted of microbeads of 15 μm diameter, made of different elements (Sn: 62%; Pb: 36%; Ag 2%) combined to obtain a low melting point.

Figure 8:
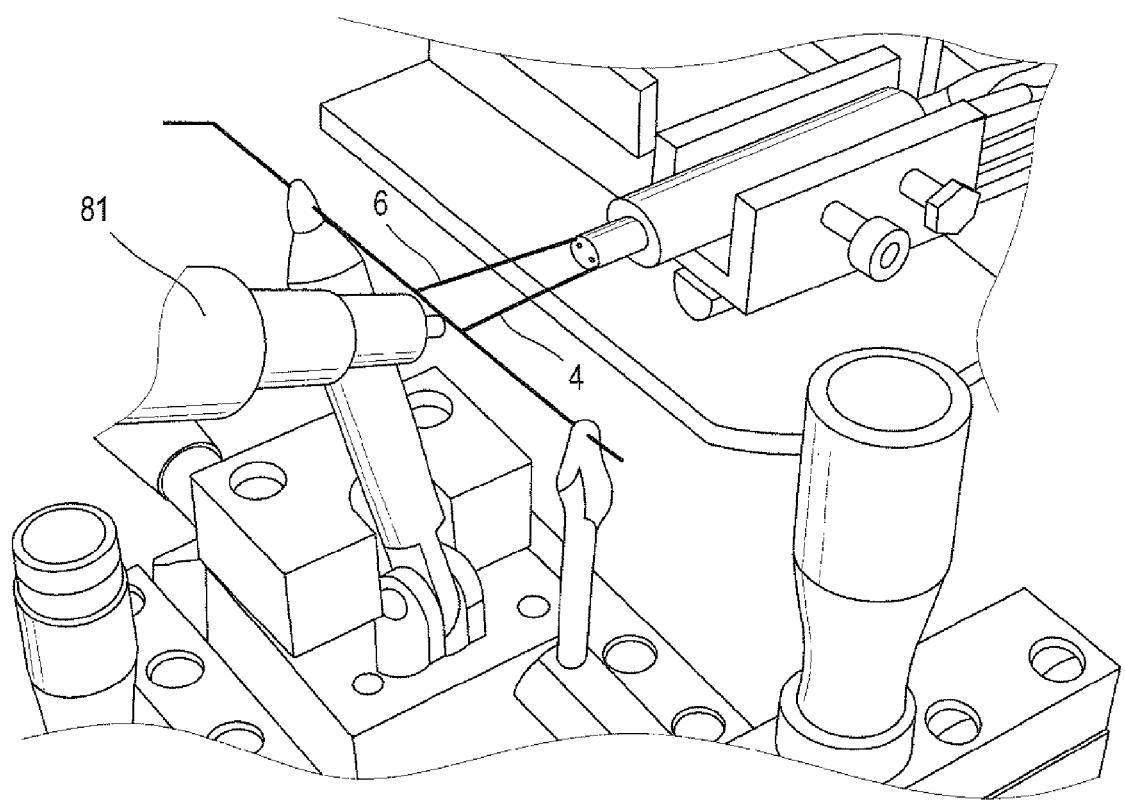

The brazing is then melted, for example by means of a hot air iron 81 (FIG. 8). At this stage, the wire 2 is made integral with the pin 4, and it then involves brazing it on its second pin 6.

However, a wire drawn between 2 pins 4, 6 is very sensitive to the least vibrations and can break very easily, and this is all the more true given the fact that the diameter of the wire 2 that is used is small. Multiple attempts have shown that, even with the greatest assembly precautions, the deterioration of a drawn wire probe can occur.

In order to increase the mechanical strength of the probes, a slight curving contour or a curvature is thus applied to the wire 2 at this moment of manufacture.

Figure 9A:
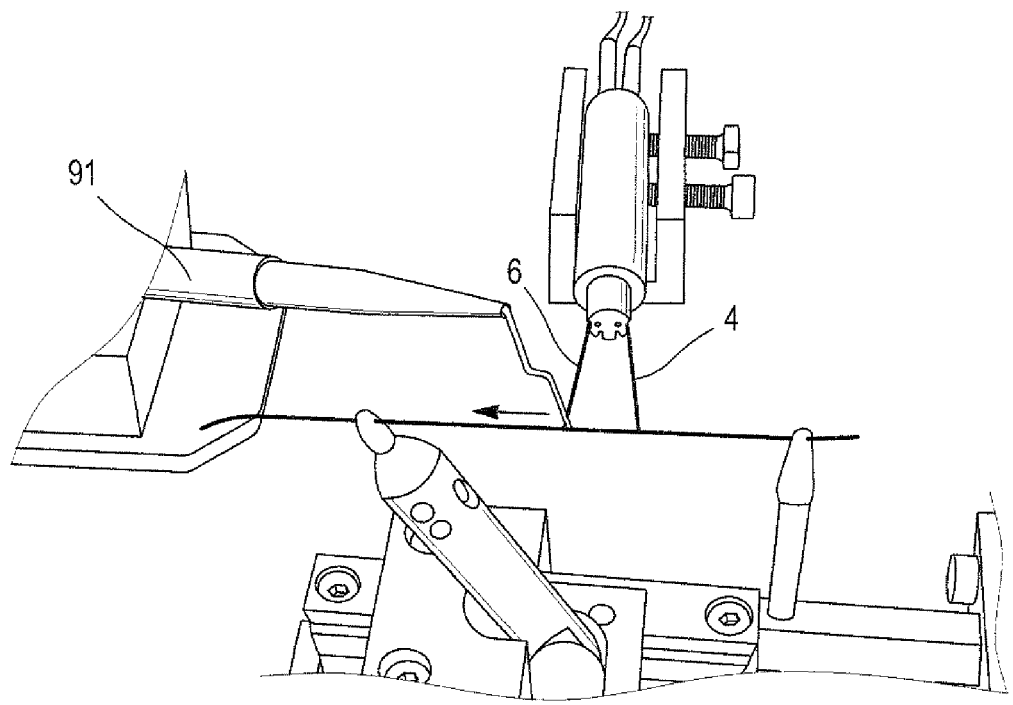

To do this, a metal rod 91, curved at its end, is brought closer towards the pin 6 with which the wire 2 is not yet joined (FIG. 9A). After having brought it into contact with the pin 6, the end of this pin is moved away in a direction substantially parallel to the wire 2, by a certain distance, for example around 20 μm, by means of a micrometric table on which the rod 91 is mounted. It is then possible to carry out the brazing of the wire 2 in the same way as for the first pin.

When the brazing has been carried out, the rod 91 is removed, and the pin 6 returns to its initial position in relation to the other 4. The wire 2 then adopts a slight curvature, or a deflection, of the order of several hundredth of a mm, for example less than $2/100^{th}$ of a mm or $4/100^{th}$ of a mm, in a plane substantially perpendicular to the axis of the body 10 of the probe. This curvature will have no influence on the anemometric measurements carried out later and confers to the wire a flexibility that enables it to absorb mechanical stresses or vibrations. The curvature obtained has no influence on the alignment condition already presented above, because it is very slight.

Figure 9B:
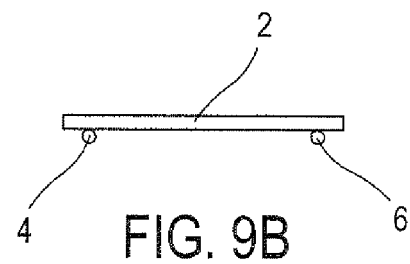

FIG. 9B represents the two ends of the two pins 4, 6 in a position separated from each other by means of the tool 91 (not represented in this figure). The wire then rests on the two pins, it is already brazed on the pin 6 but not yet brazed on the pin 4.

Figure 9C:
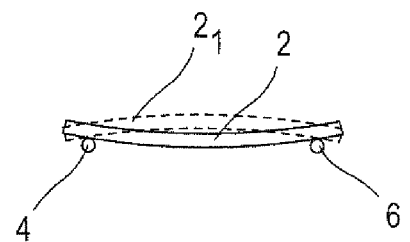

FIG. 9C represents the two ends of the two pins 4, 6 and the wire 2 after carrying out the second brazing and removal of the tool 91. The two ends of the two pins 4, 6 have recovered their positions of equilibrium. The wire is brazed, but has undergone a slight curvature, which is represented in an exaggerated manner in FIG. 9C. Two positions 2, 2$_1$ of the wire are represented in this figure, respectively with the curvature turned towards the top and towards the bottom of the figure.

The wire 2 is then cut level with the pins by means of a razor blade, in order to be able to remove the wire-holder assembly and debraze the wire ends remaining on the latter. This operation of wire-arm debrazing is carried out after cutting the wire. Indeed, the latter is very heat conducting, and, if the iron is pointed onto one of the arms 49, 51 of the support of the wire, conduction can soften the pin 4, 6—wire 2 brazing located at several millimeters, absorb the tension and the curving contour or the curvature, given to the wire as explained above, and thus seriously compromise the success of the production of the probe.

The wire thus being assembled between the pins, the active portion that is going to serve for the measurement may be laid bare.

It is possible, to this end, to proceed by stripping of the active portion 14 (FIG. 2E) of the wire. This stripping is carried out by spot dissolution of the silver sheath 20, by chemical or electrochemical attack.

Said sheath is attacked with nitric acid. To do this, two techniques may be used: that of the jet and that of the drop. In the first case, a millimetric jet of acid is projected onto the wire whereas, in the second case, a drop of acid is formed, which is slowly approached to bring it into contact with the wire. The first method was abandoned, because it is traumatizing for the wire and, when the latter is of a small diameter, the contact with a static drop is better suited to its low mechanical strength.

The length l to be stripped is determined as a function of the diameter d of the wire, knowing that, if it is wished to ensure a temperature profile as uniform as possible on the wire during its hot wire use, a l/d ratio greater than 250 makes it possible to limit the impact of the measurement of the conduction at the ends of the active portion (for a given material and thus a given cold length). By measuring the resistance of the wire, an indication of the stripped length is obtained by the following relation:

$$R = \frac{\rho l}{S}$$

where ρ is the electrical resistivity of the material, as it happens platinum-rhodium ($\pi = 1.9 \cdot 10^{-7}$ Ω·m). This resistance is thus measured during the stripping.

With wires of 0.35 μm and 0.5 μm, for a stripped length l between 0.4 mm and 0.5 mm, one has substantially:

For a diameter of 0.35 μm: 1150<l/d<1400
For a diameter of 0.5 μm: 800<l/d<1000

Figure 10:
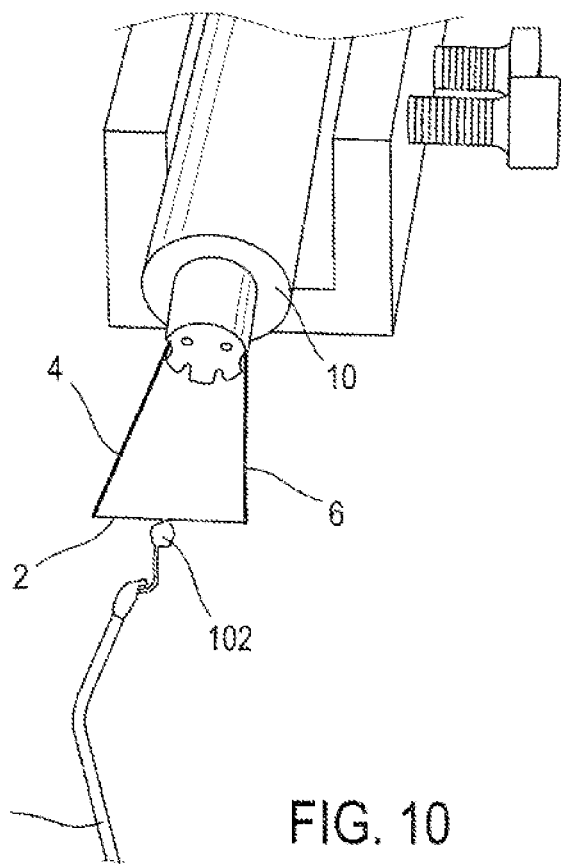

The system used here is composed of a wire 101 (FIG. 10) of several hundreds of millimeters made of stainless steel. The end of this wire forms a loop which makes it possible to maintain the drop 102. The latter, constituted of pure nitric acid, is deposited on the loop by means of a syringe. The loop and the drop are then drawn closer by means of micromanipulators to bring the latter into contact with the wire 2 to be stripped.

By means of micro-movement tables, a to and fro movement is carried out to dissolve the silver of the sheath 22. Once the drop is saturated with silver, it is removed from the wire and it is replaced by another drop of nitric acid. One proceeds in the same way until the platinum-rhodium wire 20 appears and the resistance of said wire begins to evolve. The stripped length is adjusted as a function of the resistance of the probe. Typically, one has a resistance of 500Ω for the wire of 0.5 μm diameter and 1 kΩ for the wire of 0.35 μm, which corresponds to a stripped length of 5 to 6 tenths of a millimeter, corresponding to a l/d ratio of the order of 1100 and 1600 respectively.

Once the stripping with pure acid has been carried out, a second stripping is carried out, electrochemical this time, aiming to clear the bared wire of any trace of residual silver. Indeed, if any silver remains on the wire, it is going to migrate to the grain joint of the platinum-rhodium and cause the value of its resistance to change. It will then be impossible to realign on the original calibration and to carry out correct measurements.

A simple electrical circuit constituted of a battery, a potentiometer and a switch is thus connected on the one hand to the metal loop that bears the drop and on the other hand to the two connecting wires 19, 19' (FIG. 2A) connected to the two pins 4, 6 (to avoid any dissymmetry of behaviour of the drop). As previously, a drop 102 for the stripping is then formed, but this time constituted of nitric acid diluted to 5%. It is approached in the same manner as the previous drops, such that the wire is wetted inside the drop. The switch is then actuated, briefly because the degassing is very rapid and violent at the scale of the wire. After this operation, the wire is rinsed by means of a drop of demineralised water so as to eliminate all residual traces of acid on the wire.

In the previous method, a drop is formed, the size of which depends on the size of the loop and the surface tension forces.

An annealing of the probe may then be carried out: the wire 2 is made to be traversed by a current calculated as a function of the resistance of the probe. The wire is thus heated to a temperature substantially greater than the temperature at which it is intended to work. The temperature difference between the wire and the ambient air is given by the following relation:

$$\Delta T = \frac{R_{wire} - R_o}{aR_0}$$

where $R_0$ is the resistance of the probe at ambient temperature, a the coefficient of evolution of the resistance with temperature ($1.6 \cdot 10^{-3}$ $K^{-1}$ for Pt-10% Rh) and where $R_{fil}$ is the resistance of the wire heated to the temperature $T+\Delta T$, given by Ohm's law.

This operation makes it possible to diffuse any final traces of silver in the crystalline structure of the platinum-rhodium wire. If the stripping has been carried out correctly, the residual silver being present in very small quantity, the wire stabilises after a day and its resistance no longer evolves.

The active portion 14 of a sensor according to the invention is mainly constituted of the wire 2, of very small diameter, of the order of several tens of a μm (FIG. 2E). This wire exhibits no, or little, mechanical strength.

It is thus sought to achieve a very strong alignment condition between the two sections of sheath 22 that are situated at the ends of the wire 2 (FIG. 2E), an alignment defect being able to bring about a risk of breaking of the stripped wire. An alignment defect is less than the curvature or the curving contour given to the wire. For a curving contour or a curvature of $2/100^{th}$ of a mm to $3/100^{th}$ of a mm, the alignment defect must be of the order of a hundredth of a mm, so that the curving contour maintains a dampening function.

Such an alignment is obtained in the following manner.

Firstly, the rectitude of the wire used is checked. Said wire is in general conditioned in coiled form around a reel of several cm diameter. It turns out that a tension of several grammes, for example around 4 g, on the unwound wire is sufficient so that it loses the memory of its winding. This value allows the formation of probes employing a wire 2, the active portion 14 of which has a diameter of 0.625 μm. On the other hand, for smaller diameters (0.5 and 0.35 μm), this tension turns out to be insufficient to obtain alignment conditions that ensure that there is no breaking of the wire after stripping. A wire of 0.625 μm diameter has a mechanical strength that allows a certain misalignment that wires of 0.5 and 0.35 μm do not withstand. Consequently, for the production of probes according to the invention, the tension has, in the first instance, been increased to raise it to a value of 7 g. This solution has not given satisfactory results in so far as the excess tension on the wire 2 masks the existence, while it is being put in place, of a possible alignment defect between the pins 4, 6 and the wire 2 itself. This defect may result, during stripping, in the breaking of the active portion 14, detectable only later. To counter the phenomenon of masking of this possible alignment defect, it was necessary to return to a tension less than 7 g, around 4 g in the case considered. To compensate the lack of tension, an operation of straightening up the wire is carried out beforehand, for example rolling it between a glass plate and a metal block, the surface state of which is polished (gauge block). This solution brings good results.

It is also aimed to obtain very good parallelism of the plane 43 containing the two generators of contact of the wire 2 on the cones of pins 4, 6 and the wire on itself. If this parallelism is not respected, the misalignment that results generates, after the brazing of the wire on the pins, a mechanical strain which, in return, destroys the active portion of the wire after stripping.

Experience shows that the tolerated alignment defect is of the order of a hundredth of a millimeter for a distance between pins of 8 mm. For this condition to be properly met, the mechanical strain on the wire tested is preferably less than several grammes, around 4 g.

As regards the nature of the brazing, tests have been carried out with tin-copper brazings, which are suitable for wires of diameter greater than 0.625 μm.

On the other hand, it turns out that, for diameters below 0.625 μm, the manufacture of a sensor becomes random. After a fine analysis of the production conditions and the crosschecking of problems, it has appeared that the mechanical strength of the tin-copper alloy is not sufficient, in particular to prevent, during the cutting of the wire, a rotation of the latter at the level of the pins, in the place where it should normally be considered, from the mechanical point of view, as built in. Consequently, this relative displacement of the wire on the pins generates an alignment defect of the two sleeved parts of the wire. This misalignment may lead to the breaking of the wire, after stripping.

To circumvent the creep effect that causes the effort that generates a cutting with a razor blade at the level of the pins, it is possible to implement other cutting means, for example a disc turning at high rotation speed, so as to make the shear stress almost zero at the level of the brazing. This cutting method is entirely satisfactory for single wire probes, but becomes inoperable for multi wire probes. Indeed, the phase of cutting by means of the disc highlights the existence of a liquid (that it is assumed is lubrication liquid, so that, during the phase of manufacture, strain hardening between the silver sheath 22 and the platinum-rhodium core 20 can take place normally). The latter, by polluting the surrounding pins, makes their brazing impossible.

The use of brazing based on tin-lead alloy has enabled this problem to be resolved. Such a brazing has much better mechanical strength and enables manual cutting of the wire by razor blade, much easier to implement, in particular in the case of the multiwire probe.

With this new brazing, the portion of the wire located between the pins no longer suffers from any stress linked to this operation.

With regard to the characteristic dimension of the components (diameter of the wire of the order of 50 μm, end of the pins of the order of 20 μm), the brazing is preferably carried out with a hot air gun 81 (FIG. 8), which enables brazing at a distance without contact, thanks in particular to a jet of air that transports the energy necessary to melt the brazing paste. Nevertheless, difficulties arise, linked to the fact that the jet may not be of spot size.

Chronologically, the activity of manufacturing probes equipped with wires of very small diameters began with the wire of 0.625 μm. For the first probes, we continued stricto sensu the manufacturing method that we had developed for probes equipped with 2.5 μm wire. In a systematic manner, during the stripping phase, there was breaking of the 0.625

µm wire. Analysis work made it possible to highlight two causes responsible for the breaking of the wire, when said breaking occurs.

The first concerns the existence of a residual mechanical strain in the Wollaston wire, due to the fact that the wire was installed without prior tension, which did not cancel out sufficiently the residual memory of its winding on the conditioning reel. As already explained above, a step of rectification and a mechanical strain on the wire of several grammes, (around 4 g) enable this problem to be resolved.

The second cause is linked to a phenomenon of thermal expansion, which was only able to be highlighted in a systematic manner when the wire was prepared with a mechanical strain. During the stripping, the active portion 14 of the wire was always more or less aligned with the two sections of sheaths 22, but a gap appeared between the two parts of the broken wire at the level of the break. This gap was the signature of the existence of a phenomenon of thermal expansion.

Qualitatively, this process of thermo-mechanical tension in the wire only exists because the solidification constant of the brazing is lower than the cooling constant of the wire. To this is added the high diffusivity value of silver, which means that the heated length may reach several millimeters during the brazing liquefaction time. On the basis of a simplified modelling of the heated length on the wire, the temperature difference undergone by the wire and the time of exposure to the heat source, the estimation of the shortening of the wire after solidification of the brazing is of the order of 10 µm. To neutralise this phenomenon of thermo-mechanical tension, which undoubtedly signifies the breaking of the active portion 14 of the wire, the size of the hot air iron nozzle 81 was, in a first instance, reduced, assuming that this solution was going to contribute to a reduction in the heating of the wire. Unfortunately, this option did not give satisfactory results; on the other hand, it made a problem of driving the brazing underneath the pin appear, linked to the increase in the velocity of the hot air at the outlet of the nozzle. It is thus not possible to reduce indefinitely the diameter of the nozzle, especially for a too low value of the latter, the energy transferred to the brazing is moreover no longer sufficient to ensure its melting.

One solution, which takes into account this ineluctable effect of thermo-expansion of the wire, consists in slightly buckling one of the pins 4, 6 before the brazing, and then releasing it, so as to recover, for the wire, a situation without residual stress.

However, the manufacture of double probes with parallel wires proves to be difficult to carry out with this brazing technique. The distance between the two wires is never sufficient so that there is no interaction of the jet of the hot air iron 81, with a first wire already brazed, during the brazing of a second wire. One response to this problem consists in implanting, in the space between the two pairs of pins, a heat screen intended to protect the first wire.

Another technique implements a very localised input of power by laser beam, the spot nature of which has the advantage of not thermally polluting the environment. The laser employed is of pulse mode, of YAG type with a maximum power of 30 W. The frequency and the duration of the pulses are adjustable. The beam is focused on the brazing point at the end of the pin thanks to a camera coupled to the laser, and a laser shot is carried out which brings about the melting of the brazing and couples the wire to the pin.

The implementation of this technique makes it possible to ensure the brazing operation, whatever the degree of miniaturisation of the probe and the number of wires that it comprises.

Experience shows that the handling of probes becomes very delicate from the moment that the diameter of the wires becomes less than 0.625 µm. In particular, during the assembly of a probe according to the invention in a wind tunnel, vibrations are created, which constitute a critical element for the resistance of the sensor because they are sufficient to create a wave that propagates in the pins up to the wire. Due to its low mechanical strength, the presence of the curvature of the active portion is no longer sufficient to dampen these vibrations, which can lead to the breaking of the wire. It has been noted that it is via the body of the probe that is transmitted most of the vibrations to the end of the pins, for example during its blocking on its support by means of a screw.

The optimal solution for protecting the wire consisted in inserting the ceramic probe body, once provided with its pins, in a dampening sleeve 12 of very low hardness (of the order of 25 shores A).

A probe according to the invention is used with current supply means, and means for measuring variations in electrical resistance of the wire, or wires. It is these variations that reflect the variations in velocity and/or temperature of a fluid that transports a flow in which is plunged the probe.

Generally speaking, to carry out a measurement that is both precise and reproducible, it is preferable to use a battery power supply. Thus, the system is decoupled from the electrical network, the potentials of which can fluctuate (on account, for example, of the starting up or stopping of neighbouring installations). Moreover, the currents and/or the voltages that intervene at the level of the sensor are very weak and may be easily perturbed by these network fluctuations, so small are they.

Furthermore, in installations such as a wind tunnel, it is difficult to place correctly at the same potential the different ground points. Loop currents between these different ground points ensue, driven by the potential fluctuations of the network, currents that also perturb the measurements in an important manner.

This solution makes it possible moreover to supply all of the circuits, which thus have a fixed and no longer fluctuating ground potential, as may be the case when they are connected to electronic voltage regulators.

In order to ensure electromagnetic compatibility (EMC), the circuits are preferably placed in a box, for example of copper, which constitutes a ground plane, connected to the ground of the battery. To this ground plane is also connected a braid surrounding the connection wires of the probe. Thus, all of the protections of this type vis-à-vis electromagnetic fields are connected to a fixed potential.

The solutions found above to ensure on the one hand an unperturbed supply and on the other hand electromagnetic compatibility apply to all types of operation of the anemometer.

A particular operation is the operation known as "cold wire operation". This involves a constant current mode of operation, in which the current with which the wire is supplied is very weak.

Cold wire anemometers are already known.

The problems of supply encountered in these known devices have been described in the introduction to the present application.

It may simply be recalled here that, in this type of operation, the temperature difference is low and the current with which the wire is supplied is very weak. It serves just to be able to measure a voltage at the terminals of the wire in order to go up to the value of its resistance. It is generally of the order of 50 to 200 µA. Thus, the heating of the wire by Joule effect is negligible, which explains why this anemometer is known as a cold wire thermometer.

With this type of device, the measured temperature drifts, it is thus necessary to associate the probe with a thermocouple to have a measurement of the average temperature.

Figure 11:
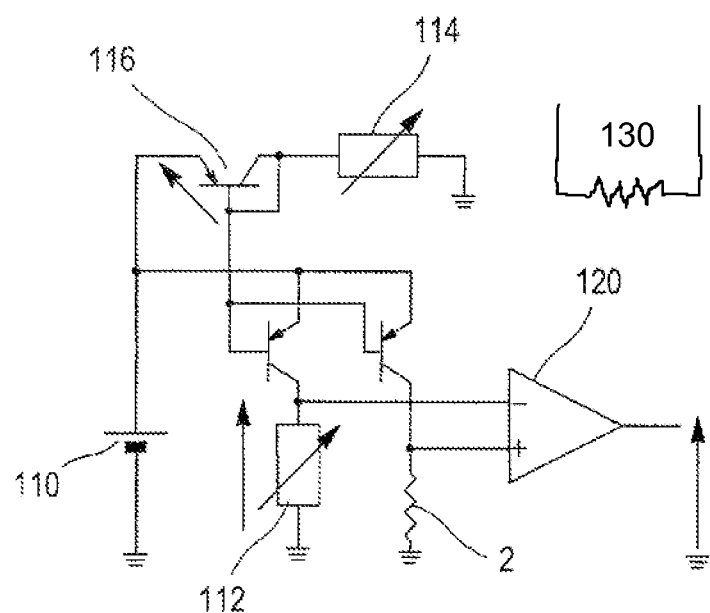
FIG. 11 represents a supply and measurement circuit that can be used within the scope of the present invention.

Electronic means associated with a constant current anemometer are represented in FIG. 11, in which the wire is still designated by the reference 2. The circuit represented comprises moreover:

supply means 110, preferably a battery as explained above,
a reference resistor 112,
a potentiometer 114 for the adjustment of the current.

More specifically, the supply of the circuit Ve, represented by the battery 110, is provided by a voltage regulator (MAX 6325). The two resistors 2, 112 are current mirror mounted. The regulation of the current passing through the two branches of the mirror, each of the branches comprising one of said two resistors, is achieved by the voltage Vbe of a regulating transistor 116, diode mounted, via the potentiometer 114. The potential difference between the probe 2 and the reference resistor 112 is applied to an operational instrumentation amplifier 120. The output of the amplification supplies a measured signal which reflects the variations in the resistance of the wire 2.

In order to exploit the information of low amplitude, the signal is amplified at the terminals of the probe 2. Preferably, and in order to take into account voltage limitations of the acquisition cards, said amplification is not too important (it is attempted to take account of the voltage resolution of the acquisition card). Yet an anemometer probe 2 has a considerable resistance, and the variations at the output of the anemometer, after amplification, may go beyond the operating ranges of the cards. Which is why it is chosen to centre the output signal of the thermometer on around zero; this also makes it possible to profit as much as possible from the range of measurement and thus to adjust the gain accordingly. To do this, a subtraction is performed between the signal at the terminals of the probe 2 and the signal at the terminals of a reference resistor 112.

The current mirror mounting makes it possible to have a stable signal passing through the reference resistor, as well as a stable current passing through the probe 2.

Such a device has been used within the scope of test campaigns in a wind tunnel, the probe being a probe with a wire operating as cold wire.

A drift of average temperature measurements was then noticed, abnormal according to the measurement conditions and the reference probe 112, made of platinum, of the installation. It turns out that this drift could only come from the electronic circuit. The components are in fact sensitive to the temperature of the surrounding environment, and an ambient temperature difference between the calibration room and the wind tunnel could entirely explain the observed differences.

In a first instance, the reference resistor 112 was replaced by a metallic resistor, the coefficient of variation with temperature of which is well below (0.6 ppm/° C.) and negligible.

Readings of the different voltages brought into play were taken by placing the electronic circuit in an oven, the temperature of which is monitored. In this way it is possible to verify that the electronic voltage regulator does not see the value of the voltage that it delivers vary with temperature (drift of 5 $\mu V \cdot ° C.^{-1}$). The two voltages at the terminals of the reference resistor and at the terminals of a second resistor intended to simulate the probe showed a drift, perfectly coordinated, of the order of 250 $\mu V \cdot ° C.^{-1}$ (for resistors of 670Ω).

This thus indicates that the current varied in a simultaneous and identical manner in the two branches of the current mirror.

An interest was thus taken in the value of the voltage Vbe which fixes this current. A reading under the same conditions indicated a drift of this voltage of 2.4 $mV \cdot ° C.^{-1}$. This drift finds its origin in the fact that the transistor 116 concerned by this voltage is diode mounted; yet, the voltage drift usually observed at the terminals of a diode is around 2.5 $mV \cdot ° C.^{-1}$, which agrees perfectly with our readings.

To cancel this drift, the components of the thermometer (the probe and its supply and measurement means) are maintained at constant temperature. This constant temperature is not only temperature of the probe, but also the temperature of the reference probe 112 and the temperature of means 120 to carry out a difference between the signal at the terminals of the wire of the probe and the signal at the terminals of the reference resistor.

As an example of a means 130 for maintaining the constant temperature, the power of a heating carpet placed in the box of the anemometer is regulated electronically.

The electronic circuit of the thermometer is thereby maintained at a temperature above that of the room in which it is placed. This temperature at which the circuit is maintained is regulated to more or less a tenth of a degree. Thus, not only the components that constitute the anemometer do not drift, but they operate under reproducible conditions.

This device makes it possible, after a single calibration of the whole of the anemometric chain, to measure in the flow not only fluctuations in temperature, but also its average value, which is an original result. Indeed, even in cases of known devices for which particular care is taken in the metrology and the measurement (this is particularly the case of temperature measurements at the output of a jet reported by Andreopoulos in "Experimental investigation of jets in a cross flow", Journal of Fluid Mechanics, 1983), the fluctuations in temperature are measured by a cold wire whereas the average value is given by another means such as a thermistor or a thermocouple.

The circuit described in this portion is applicable to a probe with several wires. As many circuits as necessary may be formed.

An example of calibration and use will now be given.

The calibrations are carried out in a wind tunnel. The air passes successively in a heating box and a water exchanger, the power and the flow of which may be independently adjusted in order to obtain the desired temperature levels, between ambient temperature and around 150° C.

The cold wire probe 2 is placed in the calibration air stream (surrounded by a thermal guard ring), at the centre of the outlet of an air injection nozzle. The temperature of the enclosure is given with a precision of a tenth of a degree by a reference probe Pt100 associated with an electronic measurement box (reference: Sfere DGN75T).

For each calibration point, a point of operation of the heating box and the exchanger is chosen. Thermal equilibrium is then left to be established between the air and the walls of the wind tunnel, an operation that takes several hours (typically 4). A reading of the voltage delivered by the thermometer is then taken for thirty or so seconds, a value largely sufficient to obtain a convergence of the measurement.

The operation is repeated five times to obtain the calibration coefficients of the linear dependence of the output voltage of the thermometer as a function of the temperature of the fluid:

$$E = A + B \cdot T \tag{4}$$

Figure 12:
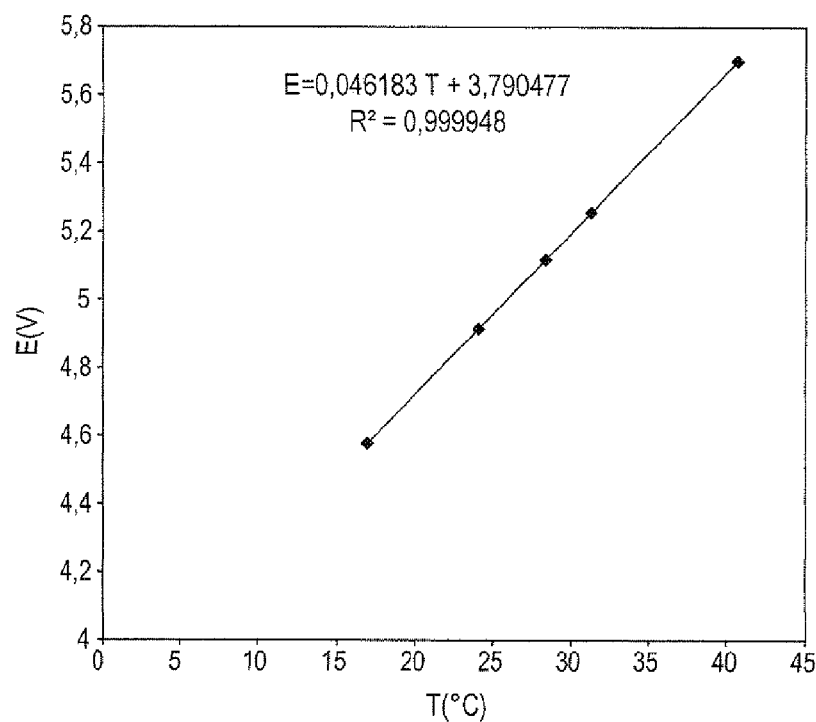
FIGS. 12 and 13 are measurement curves according to the invention for a thermo-anemometer according to the invention.

A typical example of calibration is presented in FIG. 12. It may be observed in this figure that the linear regression gives an excellent result.

Figure 13:
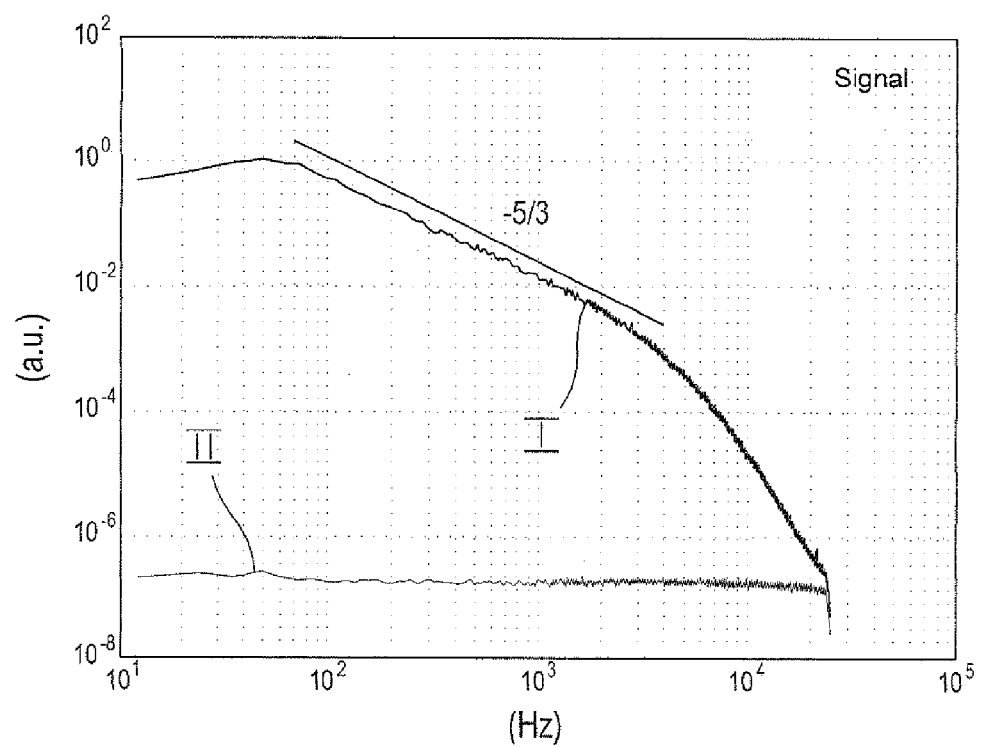

In FIG. 13 is drawn (curve I) an energy spectral density derived from a measurement of the temperature fluctuations on a wind tunnel. This measurement was carried out at 50 kHz for 10 seconds at 3 hydraulic diameters of jet downstream on its external envelope (mixing layer) by means of a probe 2, the wire 20 of which has a diameter of 0.5 μm. The flow conditions were as follows: Re=55000 and Reject=60000 (based on the hydraulic diameter of the conduits). The temperature difference between the flows was 13° C.

Curve II represents the energy spectral density of the voltage signal at the output of the thermometer with a resistor connected in place of the wire probe. This density thus represents the noise of the thermometer.

Between the largest scales captured by the thermometer and the noise of said thermometer, a difference of 7 decades may be observed on this line, i.e. a ratio in this case between discernable large and small scales of the order of 3000. In other words, the resolution of the thermometer in this case is around $5.10^{-3}$° C.

Such a resolution and an energy spectral density having such a large amplitude between large and small scales constitutes original performance.

For measurements in a non-established situation (impact of heated jet on a wall), the probe according to the invention makes to possible to carry out measurements without correction.

Moreover, the invention proposes an improvement to thermometers, to make them stable to significantly increase the sensitivity thereof. One thus has a thermo-anemometer having an established signal to noise ratio of several thousands (3500 for the thermometer and 10000 for the constant voltage anemometer) when it is associated with a probe with wires of small diameter according to the invention.

The invention makes it possible to carry out an operation of a cold wire anemometer, without thermocouple, to have a measurement of the average temperature. The regulation circuit proposed makes it possible to compensate the drift and to do without a thermocouple.

The regulation circuit proposed here may be applied to a probe according to the invention, described above with reference to FIGS. 2A-10, or with another type of anemometer probe.

The invention claimed is:

1. A thermo-anemometer, comprising:
    means for supplying and means for regulating a supply current at a constant level to a wire of a wire anemometer and a reference resistor,
    means for establishing a difference between a signal at the terminals of the wire and a signal at the terminals of the reference resistor, and
    means for maintaining a constant temperature of the reference resistor and the wire;
    wherein said means for regulating a supply current comprises a diode-mounted regulating transistor and a potentiometer and is configured to regulate the supply current such that the wire anemometer operates in cold wire operation.

2. The thermo-anemometer of claim 1, wherein the wire anemometer further comprises:
    n wires (n>1) that are mutually parallel, and separated by a distance;
    two pins for holding each of the wires in place, the end of each pin comprising a flat zone for positioning and fastening the wire,
    a straight portion of wire, brazed onto each of said flat zones for positioning and fastening each of the wires; and
    at least one of the wires comprising a central core, of diameter d, and a sheath, which is eliminated on a portion of wire, known as sensitive zone, of length l, with l/d between 600 and 1500.

3. The thermo-anemometer according to claim 2, wherein the ends of the pins are separated by a distance at least equal to 4 mm.

4. The thermo-anemometer according to claim 2 wherein at least one of the wires comprises a central core of diameter d between 0.35 and 0.6 μm, and a sheath, eliminated on a portion of wire, known as sensitive zone, of length between 0.4 mm and 0.5 mm.

5. The thermo-anemometer according to claim 2, wherein the wire is brazed onto the pins by means of a brazing based on lead or a tin-lead alloy.

6. The thermo-anemometer according to claim 2, wherein the wire has a curving contour.

7. The thermo-anemometer according to claim 2, wherein the pins are fastened to a probe body provided with a vibration dampening envelope.

8. A method for measuring temperature in a flowing fluid, comprising operating a thermo-anemometer having a reference resistor by supplying and regulating a supply current at a constant level to a wire for the thermo-anemometer, establishing a difference between a signal at the terminals of the wire and a signal at the terminals of the reference resistor, and
    maintaining a constant temperature of the reference resistor and the wire in a cold wire operation by regulating the supply current.

9. The method according to claim 8, wherein the method for measuring temperature in a flowing fluid is carried out without additional operation of thermistor or thermocouple.

10. The method according to claim 8, including measuring variations in temperature and an average temperature with the thermo-anemometer.

11. A circuit for regulating a wire anemometer, comprising:
    a battery for supplying a supply current to a wire of the wire anemometer and a potentiometer and a diode-mounted regulating transistor for regulating the supply current of the wire at a constant level and to a reference resistor,
    an amplifier for establishing a difference between a signal at terminals of the wire and a signal at the terminals of the reference resistor, and
    means for maintaining a constant temperature such that the wire anemometer is in cold wire operation.

12. The device according to claim 11, wherein the wire and the reference resistor are current mirror mounted.

13. A thermo-anemometer, comprising:
    a wire anemometer in cold wire operation, and
    a regulation device for regulating the wire anemometer, at constant current, having:
        a battery for supplying current to a wire of the wire anemometer and a potentiometer and a diode mounted regulating transistor for regulating a supply current of the wire and a reference resistor,
    an amplifier for establishing a difference between a signal at the terminals of the wire and a signal at the terminals of the reference resistor, and
    means for maintaining a constant temperature of the reference resistor and the wire.

14. The thermo-anemometer according to claim 13, wherein the wire anemometer includes:

a) two pins for holding the wire of the wire anemometer in place, the end of each pin comprising a flat zone for positioning and fastening the wire, and
b) a straight portion of wire, brazed onto said flat zones for positioning and fastening the wire.

* * * * *